2,952,334
PREPARATION OF ANHYDROUS HYDRO-FLUORIC ACID

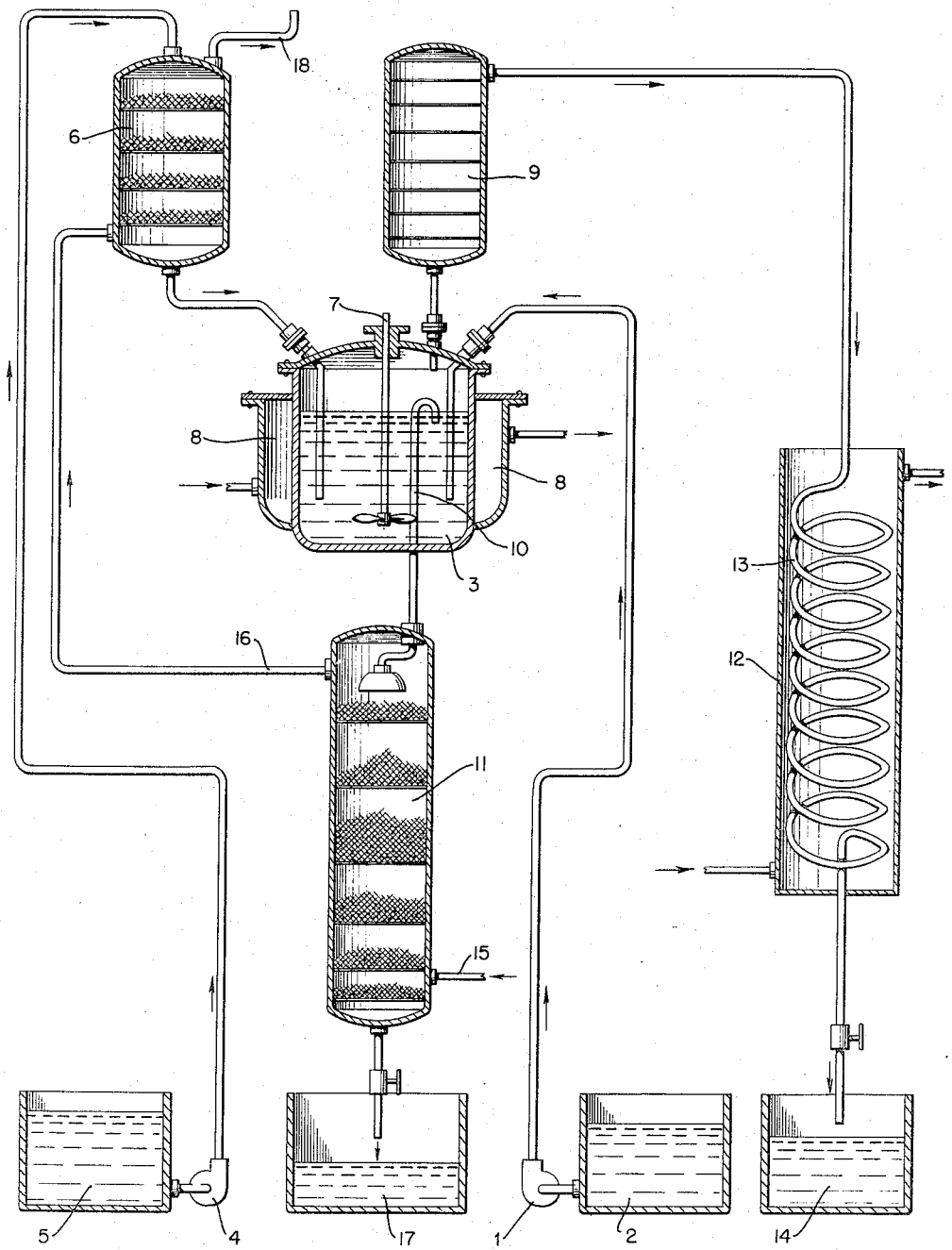

Marguerite Provoost and Jacques Chastel, Paris, France, assignors to Compagnie de Saint-Gobain, Paris, France Filed Jan. 9, 1959, Ser. No. 785,845

6 Claims. (Cl. 183—115)

This invention relates to the preparation of anhydrous hydrofluoric acid by extraction from solutions of various substances, and particularly from dilute aqueous solutions.

It is known to use the desiccating power of concentrated sulfuric acid to extract volatile acids from their aqueous solutions when direct distillation produces an azeotrope with water. This process has not been satisfactory in the extraction of hydrofluoric acid because, in order to obtain a reasonable yield, it has been necessary to heat to temperatures on the order of 160°–170° C., which is difficult to do because the aqueous solutions of sulfuric acid and hydrofluoric acid at these temperatures are highly corrosive. Furthermore, a considerable proportion of HF remains in the sulfuric acid as sulfuric fluorhydrin, which can be converted to HF by hydrolysis produced by dilution with water. Even so, distillation only produces aqueous HF which must be redistilled in the presence of concentrated sulfuric acid to produce the anhydrous HF. This process results in recycling a substantial quantity of aqueous HF.

It is an object of this invention to produce substantially pure, substantially anhydrous HF.

Another object is to produce this product continuously from its aqueous solutions using sulfuric acid as a desiccator and with a substantial total recovery of HF.

The objects of the invention are accomplished, generally speaking, by the method of preparing substantially pure HF that comprises mixing a solution of HF in concentrated $H_2SO_4$ and a solution of HF in $H_2O$ to form a bath, distilling HF from the bath at about 120° C., thereby producing substantially pure HF, withdrawing distilland from the bath at a rate which, combined with the distillation of HF, equals the rate of addition of said solutions to the bath, stripping HF from the withdrawn distilland by contact with an inert gas, and stripping HF from the inert gas with concentrated $H_2SO_4$, thereby forming a solution of HF in concentrated $H_2SO_4$ adapted for addition to the bath as aforesaid.

The process involves mixing an aqueous solution of hydrofluoric acid and concentrated sulfuric acid, heating the mixture to a moderate temperature in order to distill off anhydrous HF without producing serious corrosion of the apparatus, leaving some of the HF in solution, thereafter putting the dilute sulfuric acid containing the remaining HF in contact with currents of gas inert to HF. This gas captures the HF and moves it from the solution, after which the gas, charged with HF, is brought into contact with concentrated sulfuric acid which captures substantially all of the HF.

The above and further objects and novel features of the present invention will more fully appear from the following detailed description when the same is read in connection with the accompanying drawing. It is to be expressly understood, however, that the drawing is for the purpose of illustration only and is not intended as a definition of the limits of the invention, reference for this latter purpose being had primarily to the appended claims.

The accompanying drawing is a diagram of the system in operation.

A reaction vessel 3, provided with an agitator 7 and a circumferential heating chamber 8, receives from supply tank 2 and pump 1 a flow of dilute HF, and from supply tank 5 and pump 4 a supply of concentrated $H_2SO_4$. These initial ingredients are mixed by the agitator and the temperature is brought to about 120° C. by the heating chamber 8, at which temperature HF is vaporized and passes to a rectifier 9 of standard type, thereafter passing as substantially pure HF to condenser 12—13, from whence it is delivered to storage tank 14. The bath in tank 3 is kept at constant level by an overflow device which brings the distilland to a tower 11, the levels of which are supplied with particles of coke. Air, or any other inert gas, is admitted to the base of the tower through supply pipe 15, and ascends through the tower 11, stripping the part of the distilland in the tower of its HF. The air flows through pipe 16 to the base of tower 6, which is also provided with levels of coke, down over which the concentrated $H_2SO_4$ from tank 5 is flowing. This results in a substantially complete capture of the HF by the $H_2SO_4$ and the release through pipe 18 of air which is substantially devoid of any HF.

The solution of HF is concentrated $H_2SO_4$ then flows into the vat 3.

From the bottom of tank 11, dilute $H_2SO_4$ flows into receptacle 17.

The feeding of receptacle 3 with sulfuric acid and dilute HF is matched by the withdrawal of distilled HF and the flow of distilland to the tower 11. The finely divided material in the tower 11 should be free of silica and may be particles of coke or graphite Raschig rings, for example.

The finely divided material in tower 6 is of the same nature as that in tower 11.

It is advantageous to keep the temperature of the receptacle 3 around 120° C., which is low enough to substantially eliminate corrosion of the apparatus and to control the relative amounts of concentrated sulfuric acid and dilute HF so that the content of $H_2SO_4$ after the distillation of HF is on the order of 75% by weight. This corresponds, in effect, to a water content in the mixture sufficient to cause the hydrolysis of sulfuric fluorhydrin in the residuary acid flowing from tank 3 and the liberation of HF. Furthermore, the vapor tension of water at 120° C. is so low that the HF passing through column 9 is practically anhydrous.

The following example illustrates the invention:

The receptacle 3, having a useful volume of 10 liters, is continuously supplied with 35 kl. per hour of $H_2SO_4$ of 98% concentration and with 17.4 kl. per hour of 42.6% HF. By circulation of the heating fluid, the liquid is maintained at about 120° in receptacle 3, which distills off about 70% of the HF which was brought in in the form of an aqueous solution. The dilute sulfuric acid, containing about 75% of $H_2SO_4$ and all the remainder of the HF constituting the distilland, flows out of receptacle 3 by the overflow 10 at a rate of 44.8 kl. per hour. This acid carries with it about 5% (2.2 kl.) per hour of pure HF. The distilland enters the column 11 which has a diameter of 150 mm. and a height of 2000 mm. and is supplied to a height of 1750 mm. with coke grains of between 6 and 9 mm. in size. It is maintained at about 100° by the circulation of steam in a double envelope, which is not shown. At the base of the column there are introduced 30 cm. per hour of air, and there is discharged from the bottom of the tower 45 kl. per hour of 75% $H_2SO_4$. The currents of air extract the HF and pass out of the column 11 to column 6 which has a diameter of 150 mm. and a height of 1500 mm. and is also supplied with coke or the like, as in the case of column 11. Column 6 receives 35 kl. per hour of 98% $H_2SO_4$ which strips the HF-laden air of its HF and returns the HF to receptacle 3. The air which escapes from the top of the tower 6 through chimney 18 is substantially devoid of HF. Column 9 releases 7.2 kl. per hour of substantially 100% HF, which after condensation in condenser 12 at 0° C. is received in reservoir 14. The yield is 97.5% based on the HF introduced in the aqueous solution.

Advantages of the invention are the production of substantially pure, substantially anhydrous HF with an efficiency of 97.5% under conditions such that the problems of corrosion of the apparatus are substantially eliminated.

Another advantage of the invention is that it makes $H_2SO_4$ available for the desiccation of HF.

Another advantage is a practical, highly efficient process of producing anhydrous HF.

As many apparently widely different embodiments of the present invention may be made without departing from the spirit and scope thereof, it is to be understood that the invention is not limited to the specific embodiments.

What is claimed is:

1. A method of separating HF from dilute $H_2SO_4$ solution that comprises adding HF in concentrated $H_2SO_4$ to said solution, evaporating HF from said solution, removing HF from said solution by contact with a flow of inert gas, and removing the HF from said gas by contact with concentrated $H_2SO_4$.

2. A method of separating HF from dilute aqueous solution that comprises mixing the dilute aqueous solution with HF in concentrated $H_2SO_4$, removing some HF by distillation, removing additional HF by sweeping the solution with an inert gas, scrubbing the inert gas containing HF with concentrated $H_2SO_4$, and mixing the concentrated $H_2SO_4$ containing HF with dilute aqueous HF as aforesaid.

3. A method of separating HF from dilute aqueous solution that comprises mixing the dilute aqueous solution with HF in concentrated $H_2SO_4$, removing some HF by distillation, removing additional HF by sweeping the solution with an inert gas, and stripping the inert gas of HF with concentrated $H_2SO_4$.

4. A method of separating HF from dilute aqueous solution that comprises mixing the dilute aqueous solution with HF in concentrated $H_2SO_4$, removing some HF by distillation at about 120° C., removing additional HF by sweeping the solution with an inert gas, and preparing HF in concentrated $H_2SO_4$ for use in the process by scrubbing the inert gas containing HF with concentrated $H_2SO_4$.

5. The method of preparing substantially pure HF that comprises distilling a mixture of HF, concentrated $H_2SO_4$ and $H_2O$ at a temperature about 120° C., thereby extracting substantially pure HF and leaving some HF in solution, adding dilute HF, and HF in concentrated $H_2SO_4$, to said solution in proportions producing a distilland of about 75% by weight $H_2SO_4$, subjecting distilland to sweeping with an inert gas, stripping the gas of HF with concentrated $H_2SO_4$, and adding the $H_2SO_4$ to the said mixture.

6. The method of preparing substantially pure HF that comprises mixing a solution of HF in concentrated $H_2SO_4$ and a solution of HF in $H_2O$ to form a bath, distilling HF from the bath at about 120° C., thereby producing substantially pure HF, withdrawing distilland from the bath, stripping HF from the withdrawn distilland by contact with an inert gas, and stripping HF from the inert gas with concentrated $H_2SO_4$, thereby forming a solution of HF in concentrated $H_2SO_4$ adapted for addition to the bath as aforesaid.

References Cited in the file of this patent

UNITED STATES PATENTS

| | | |
|---|---|---|
| 2,726,932 | Shire | Dec. 13, 1955 |
| 2,781,862 | Fussman | Feb. 19, 1957 |